| (12) | United States Patent | (10) Patent No.: | US 12,010,639 B2 |
|---|---|---|---|
| | Yang et al. | (45) Date of Patent: | Jun. 11, 2024 |

(54) SECONDARY CELL ACTIVATION

(71) Applicant: Nokia Technologies Oy, Espoo (FI)

(72) Inventors: Tao Yang, Shanghai (CN); Karol Schober, Helsinki (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 386 days.

(21) Appl. No.: 17/617,461

(22) PCT Filed: Jul. 9, 2019

(86) PCT No.: PCT/CN2019/095322
§ 371 (c)(1),
(2) Date: Dec. 8, 2021

(87) PCT Pub. No.: WO2021/003678
PCT Pub. Date: Jan. 14, 2021

(65) Prior Publication Data
US 2022/0225251 A1 Jul. 14, 2022

(51) Int. Cl.
*H04W 56/00* (2009.01)
*H04L 5/00* (2006.01)
*H04W 80/02* (2009.01)

(52) U.S. Cl.
CPC ......... *H04W 56/001* (2013.01); *H04L 5/0051* (2013.01); *H04L 5/0053* (2013.01); *H04W 80/02* (2013.01)

(58) Field of Classification Search
CPC .. H04W 56/001; H04W 80/02; H04L 5/0051; H04L 5/0053; H04L 5/005; H04L 5/0055; H04L 5/0098; H04L 5/0007
See application file for complete search history.

(56) References Cited

U.S. PATENT DOCUMENTS

2012/0257570 A1* 10/2012 Jang ............... H04W 52/50
370/328
2014/0029514 A1 1/2014 Yu et al.
(Continued)

FOREIGN PATENT DOCUMENTS

| CN | 102244927 A | 11/2011 |
|---|---|---|
| CN | 102932900 A | 2/2013 |

OTHER PUBLICATIONS

"3rd Generation Partnership Project; Technical Specification Group Radio Access Network; NR; Requirements for support of radio resource management (Release 15)", 3GPP TS 38.133, V15.5.0, Mar. 2019, pp. 1-893.

(Continued)

*Primary Examiner* — Kan Yuen
(74) *Attorney, Agent, or Firm* — Robert P. Michal, Esq.; Carter, DeLuca & Farrell LLP

(57) ABSTRACT

Embodiments of the present disclosure relate to secondary cell activation. A method comprises transmitting, from a first apparatus and on a serving cell in an active status, a MAC layer command for activating at least one secondary cell to a second apparatus, the MAC layer command indicating a configuration on a procedure for activating the at least one secondary cell. The method further comprises receiving an acknowledgement for the MAC layer command from the second apparatus. The method further comprises causing the second apparatus to synchronize, based on at least the configuration and the acknowledgement, with the first apparatus on the at least one secondary cell. As such, the time for activating a Scell can be greatly shortened.

3 Claims, 6 Drawing Sheets

(56) References Cited

U.S. PATENT DOCUMENTS

| | | | |
|---|---|---|---|
| 2014/0301348 A1* | 10/2014 | Chmiel | H04L 5/0098 370/329 |
| 2015/0016372 A1* | 1/2015 | Takahashi | H04W 72/23 370/329 |
| 2016/0270007 A1 | 9/2016 | Dinan | |
| 2016/0270064 A1 | 9/2016 | Dinan | |
| 2016/0278073 A1* | 9/2016 | Dinan | H04W 36/04 |
| 2016/0285614 A1 | 9/2016 | Lee et al. | |
| 2016/0309504 A1* | 10/2016 | Dinan | H04L 5/0053 |
| 2017/0318568 A1 | 11/2017 | Nimbalker et al. | |
| 2019/0159126 A1 | 5/2019 | Kadiri et al. | |
| 2020/0177336 A1* | 6/2020 | Li | H04W 72/54 |
| 2021/0185614 A1* | 6/2021 | Zhou | H04L 5/0051 |
| 2022/0166538 A1* | 5/2022 | Miao | H04L 1/0025 |

OTHER PUBLICATIONS

"3rd Generation Partnership Project; Technical Specification Group Radio Access Network; NR; Radio Resource Control (RRC) protocol specification (Release 15)", 3GPP TS 38.331, V15.5.1, Apr. 2019, pp. 1-491.

"3rd Generation Partnership Project; Technical Specification Group Radio Access Network; NR; Physical layer procedures for data (Release 15)", 3GPP TS 38.214, V15.5.0, Mar. 2019, pp. 1-103.

"LS on maximum allowed SCell activation delay for Rel16 CA", 3GPP TSG RAN WG1 96bis, R1-1905901, Ericsson, Apr. 8-12, 2019, 1 page.

"3rd Generation Partnership Project; Technical Specification Group Radio Access Network; NR; Medium Access Control (MAC) protocol specification (Release 15)", 3GPP TS 38.321, V15.5.0, Mar. 2019, pp. 1-78.

"Fast SCG and SCell Activation", 3GPP TSG-RAN WG1 #96bis, R1-1905281, Agenda: 7.2.13.4, Qualcomm Incorporated, Apr. 8-12, 2019, pp. 1-11.

International Search Report and Written Opinion received for corresponding Patent Cooperation Treaty Application No. PCT/CN2019/095322, dated Apr. 9, 2020, 9 pages.

Extended European Search Report received for corresponding European Patent Application No. 19937113.9, dated Mar. 24, 2023, 22 pages.

"Efficient CA design", 3GPP TSG RAN WG1 Meeting RAN1#96bis, R1-1904722, Agenda: 7.2.13.4, Nokia, Apr. 8-12, 2019, 4 pages.

Partial Supplementary European Search received for corresponding European Patent Application No. 19937113.9, dated Nov. 21, 2022, 21 pages.

"SCell activation timeline in NR", 3GPPRAN4#85, R4-1713844, Agenda: 9.7.9, Qualcomm Incorporated, Nov. 27-Dec. 1, 2017, 3 pages.

"Fast SCG and SCell Activation", 3GPP TSG-RAN WG1 #97, R1-1907306, Agenda: 7.2.13.4, Qualcomm Incorporated, May 13-17, 2019, 11 pages.

"Discussion on fast SCell activation based on Aperiodic TRS (A-TRS)", 3GPP TSG RAN WG2 Meeting #105bis, R2-1904929, Agenda: 11.10.4.2, Qualcomm Incorporated, Apr. 8-12, 2019, 5 pages.

"Power saving for BWP/SCell operation in RRC_Connected", 3GPP TSG-RAN WG2 Meeting #106, R2-1905957, Agenda: 11.11.4.3, vivo, May 13-17, 2019, 7 pages.

* cited by examiner

SECONDARY CELL ACTIVATION

RELATED APPLICATION

This application was originally filed as PCT Application No. PCT/CN2019/095322, filed on 9 Jul. 2019, each of which is incorporated herein by reference in its entirety

FIELD

Embodiments of the present disclosure generally relate to the field of telecommunication and in particular, to methods, apparatuses and computer readable storage media for secondary cell (Scell) activation.

BACKGROUND

In the latest 3GPP discussions of Release 16, it has been proposed to speed up the Scell activation procedure, so as to improve user experience of a terminal device (such as, UE) and to motivate a network device (such as, a gNB) to deactivate Scell(s) more often for saving power consumption of the terminal device.

Currently, the Scell activation procedure is based on Synchronization Signal block (SSB). That is, reception of SSB(s) will be essential for UE to acquire synchronization with the network device on a Scell. It has been identified that the SSB based Radio Resource Management (RRM) measurement timing and configuration (SMTC) periodicity (typically 20 ms or more) is the main component of the Scell activation delay. Therefore, it is desirable to remove the SMTC periodicity component from the Scell activation delay.

SUMMARY

In general, example embodiments of the present disclosure provide a solution for Scell activation.

In a first aspect, there is provided a first apparatus. The first apparatus comprises at least one processor; and at least one memory including computer program codes; the at least one memory and the computer program codes are configured to, with the at least one processor, cause the first apparatus to transmit, on a serving cell in an active status, a MAC layer command for activating at least one secondary cell to a second apparatus, the MAC layer command indicating a configuration on a procedure for activating the at least one secondary cell; receive an acknowledgement for the MAC layer command from the second apparatus; and cause the second apparatus to synchronize, based on at least the configuration and the acknowledgement, with the first apparatus on the at least one secondary cell.

In a second aspect, there is provided a second apparatus. The second apparatus comprises at least one processor; and at least one memory including computer program codes; the at least one memory and the computer program codes are configured to, with the at least one processor, cause the second apparatus to receive, from a first apparatus and on a serving cell in an active status, a MAC layer command for activating at least one secondary cell; determine, from the MAC layer command, a configuration on a procedure for activating the at least one secondary cell; transmit an acknowledgement for the MAC layer command to the first apparatus; and synchronize, based on at least the configuration and the acknowledgement, with the first apparatus on the at least one secondary cell.

In a third aspect, there is provided a method. The method comprises transmitting, from a first apparatus and on a serving cell in an active status, a MAC layer command for activating at least one secondary cell to a second apparatus, the MAC layer command indicating a configuration on a procedure for activating the at least one secondary cell; receiving an acknowledgement for the MAC layer command from the second apparatus; and causing the second apparatus to synchronize, based on at least the configuration and the acknowledgement, with the first apparatus on the at least one secondary cell.

In a fourth aspect, there is provided a method. The method comprises receiving, at a second apparatus and on a serving cell in an active status, a MAC layer command for activating at least one secondary cell from a first apparatus; determining, from the MAC layer command, a configuration on a procedure for activating the at least one secondary cell; transmitting an acknowledgement for the MAC layer command to the first apparatus; and synchronizing, based on at least the configuration and the acknowledgement, with the first apparatus on the at least one secondary cell.

In a fifth aspect, there is provided a first apparatus. The first apparatus comprises means for transmitting, on a serving cell in an active status, a MAC layer command for activating at least one secondary cell to a second apparatus, the MAC layer command indicating a configuration on a procedure for activating the at least one secondary cell; means for receiving an acknowledgement for the MAC layer command from the second apparatus; and means for causing the second apparatus to synchronize, based on at least the configuration and the acknowledgement, with the first apparatus on the at least one secondary cell.

In a sixth aspect, there is provided a second apparatus. The second apparatus comprises means for receiving, on a serving cell in an active status, a MAC layer command for activating at least one secondary cell from a first apparatus; means for determining, from the MAC layer command, a configuration on a procedure for activating the at least one secondary cell; means for transmitting an acknowledgement for the MAC layer command to the first apparatus; and means for synchronizing, based on at least the configuration and the acknowledgement, with the first apparatus on the at least one secondary cell.

In a seventh aspect, there is provided a computer readable medium comprising program instructions stored thereon. The instructions, when executed by a first apparatus, cause the first apparatus to perform at least the method according to the above third aspect.

In an eighth aspect, there is provided a computer readable medium comprising program instructions stored thereon. The instructions, when executed by a second apparatus, cause the second apparatus to perform at least the method according to the above fourth aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
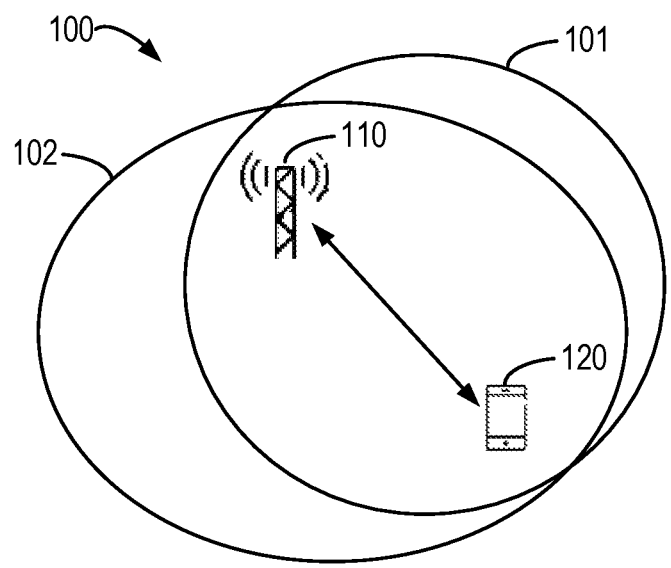
FIG. 1 illustrates an example communication network in which embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), Narrow Band Internet of Things (NB-IoT), New Radio (NR) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, a low power node such as a femto, a pico, and so forth, depending on the applied terminology and technology.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

Although functionalities described herein can be performed, in various example embodiments, in a fixed and/or a wireless network node may, in other example embodiments, functionalities may be implemented in a user equipment apparatus (such as a cell phone or tablet computer or laptop computer or desktop computer or mobile TOT device or fixed TOT device). This user equipment apparatus can, for example, be furnished with corresponding capabilities as described in connection with the fixed and/or the wireless network node(s), as appropriate. The user equipment apparatus may be the user equipment and/or or a control device, such as a chipset or processor, configured to control the user equipment when installed therein. Examples of such functionalities include the bootstrapping server function and/or the home subscriber server, which may be implemented in the user equipment apparatus by providing the user equipment apparatus with software configured to cause the user equipment apparatus to perform from the point of view of these functions/nodes.

FIG. 1 shows an example communication network 100 in which embodiments of the present disclosure can be implemented. The network 100 includes a first device 110 and a second device 120 that can communicate with each other. In this example, the first device 110 is illustrated as a network device, and the second device 120 is illustrated as a terminal device served by the network device. The network 100 may provide one or more serving cells 101, 102 to serve the second device 120, with each serving cell corresponding to at least one component carrier (CC). It is to be understood that the number of network devices, terminal devices and serving cells is only for the purpose of illustration without suggesting any limitations. The network 100 may include any suitable number of network devices, terminal devices and serving cells adapted for implementing embodiments of the present disclosure. In the following, for the purpose of illustration, the first device 110 is also referred to as the network device 110 or first apparatus 110, and the second device 120 is also referred to as the terminal device 120 or second apparatus 120.

In the communication network 100, the network device 110 can communicate data and control information to the terminal device 120 and the terminal device 120 can also communication data and control information to the network device 110. A link from the network device 110 to the terminal device 120 is referred to as a downlink (DL) or a forward link, while a link from the terminal device 120 to the network device 110 is referred to as an uplink (UL) or a reverse link.

Depending on the communication technologies, the network 100 may be a Code Division Multiple Access (CDMA) network, a Time Division Multiple Address (TDMA) network, a Frequency Division Multiple Access (FDMA) network, an Orthogonal Frequency-Division Multiple Access (OFDMA) network, a Single Carrier-Frequency Division Multiple Access (SC-FDMA) network or any others. Communications discussed in the network 100 may use conform to any suitable standards including, but not limited to, New Radio Access (NR), Long Term Evolution (LTE), LTE-Evolution, LTE-Advanced (LTE-A), Wideband Code Division Multiple Access (WCDMA), Code Division Multiple Access (CDMA), cdma2000, and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols. The techniques described herein may be used for the wireless networks and radio technologies mentioned above as well as other wireless networks and radio technologies. For clarity, certain aspects of the techniques are described below for LTE, and LTE terminology is used in much of the description below.

Carrier aggregation (CA) can be supported in the network 100, in which two or more CCs are aggregated in order to support a broader bandwidth. In CA, the network device 110 may provide a plurality of serving cells including one Pcell 101 and at least one SCell 102 to serve the terminal device 120. The terminal device 120 can establish a Radio Resource Control (RRC) connection with the network device 110 on the Pcell 101. The Scell 102 can provide additional radio resources once the RRC connection between the network device 110 and the terminal device 120 is established and the Scell 102 is activated.

As described above, in the latest 3GPP discussions of Release 16, it has been proposed to speed up the Scell activation procedure, so as to improve user experience and to motivate the network device to deactivate Scell(s) more often to save power consumption of the terminal device.

Currently, a Media Access Control (MAC) layer command is used to activate/de-activate a Scell. The Scell activation delay refers to a time interval between the slot in which an acknowledgement for the MAC layer command is received and the slot in which UE is capable to receive Physical Downlink Control Channel (PDCCH) on the Scell. In LTE, the Scell activation delay is between 16 ms to 27 ms. In NR, the Scell activation delay may depend on several factors: (i) whether the Scell is known or not; (ii) the frequency range of the Scell; and (iii) whether the SMTC periodicity is smaller than 160 ms or not. For example, if the Scell is known and in FR1 and the SMTC periodicity is equal to or smaller than 160 ms, the Scell activation delay may be at least: $T_{activation\_time} = T_{SMTC\_Scell} + 5$ ms, where $T_{SMTC\_Scell}$ represents the SMTC periodicity of the Scell.

Currently, the Scell activation procedure is based on SSB(s) and configured SMTC periodicity $T_{SMTC\_Scell}$. That is, reception of SSB(s) is essential for the terminal device to acquire synchronization with the network device on a Scell. It has been identified that the SMTC periodicity (typically 20 ms or more) is the main component of the Scell activation delay. Therefore, it would be desirable to remove the SMTC periodicity component from the Scell activation delay.

From RAN1 perspective, to remove the SMTC periodicity component from the Scell activation delay, the network device could provide an extra reference signal (RS) for DL synchronization and/or Channel State Information (CSI) preparation as early as possible. To implement this scheme, it is important to consider the trade-off between fast DL synchronization and DL RS signaling overhead. Additionally, how to efficiently trigger CSI report on the activated Scell is still unclear at this moment. Alternative, in case of intra-band CA, the DL synchronization could be obtained from the Pcell or another configured active serving cell so as to remove DL synchronization procedure completely. However, how to guide the terminal device to enable or disable the DL synchronization procedure is still unclear at this moment.

In addition, some scheme proposes to implement Downlink Control Information (DCI) based Scell activation procedure. This scheme is targeted to remove the potential Media Access Control (MAC) control element (CE) Hybrid Automatic Repeat Request (HARQ) retransmission, so as to fast reception of the activation/de-activation command. However, to implement this scheme, a totally new DCI format needs to be defined, which requires significant standardization effort. In addition, this scheme cannot handle the situation of DCI missing, hence leading to potential misalignment between the network device and the terminal device. Specifically, a network device does not know whether a terminal device has received the DCI based command or not until the whole activation is performed and CSI is reported. If the DCI is missed, the re-transmission of the DCI based activation command will take much longer than the HARQ retransmission for MAC-CE. Further, this scheme does not consider the trade-off between fast activation and DL RS signaling overhead, hence leading to redundant and meaningless RS signaling overhead in some situations.

According to example embodiments of the present disclosure, there is provided a solution for Scell activation. In this solution, the network device may transmit to the terminal device an explicit indication in the MAC layer command to guide behaviors of the terminal device in the following aspects: (i) DL synchronization tracking; (ii) Channel State Information-Reference Signal measurement; and (iii) CSI report. Further, in the intra-band CA scenario, if a Scell to be activated is configured with a synchronization reference cell which is in an active status, the terminal device can directly utilize synchronization information from the synchronization reference cell as its DL synchronization reference. As such, the SMTC periodicity component can be removed completely from the Scell activation delay and the Scell activation delay can be greatly reduced.

Figure 2:
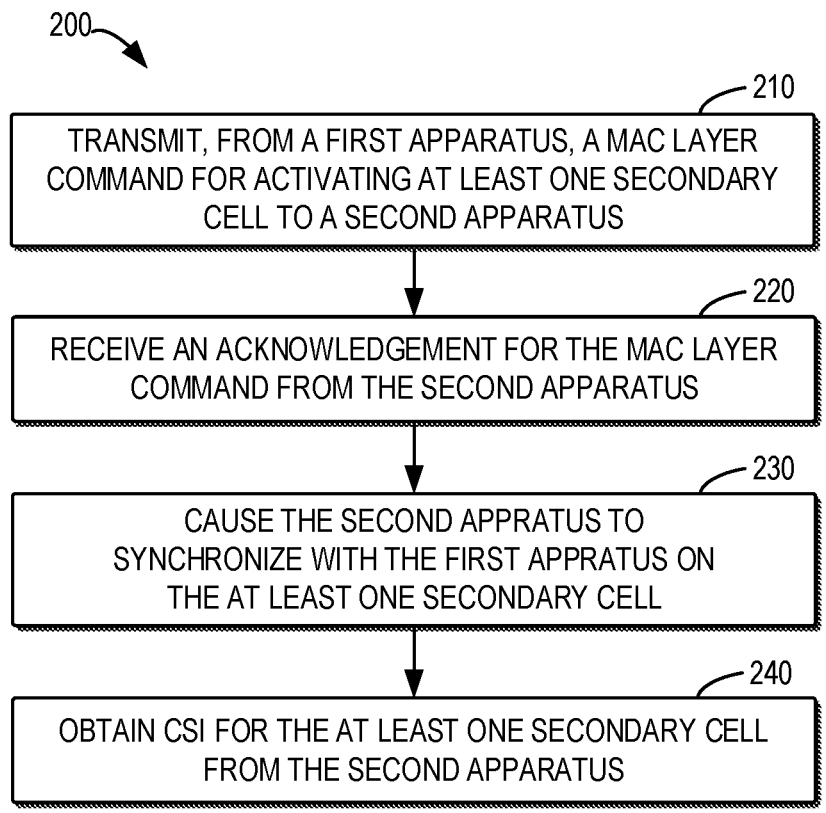
FIG. 2 illustrates a flowchart of an example method according to some example embodiments of the present disclosure.

Reference is now made to FIG. 2, which illustrates a flowchart of an example method 200 in accordance with some example embodiments of the present disclosure. For the purpose of discussion, the method 200 will be described from the perspective of the first device 110 with reference to FIG. 1. It would be appreciated that the method 200 may include additional blocks or omit some illustrated block. The scope of the present disclosure is not limited in this aspect.

At block 210, the first device 110 transmits, on a serving cell in an active status, a MAC layer command for activating at least one secondary cell to the second device 120. For example, the serving cell may be a Pcell or an active secondary cell. The MAC layer command may indicate a configuration on a procedure for activating the at least one secondary cell.

In some example embodiments, the MAC layer command may indicate, for each of the at least one secondary cell to be activated, one or more of the following procedures: (1) an aperiodic tracking reference signal (A-TRS) is to be triggered for DL synchronization; (2) a SSB burst is to be used for DL synchronization without triggering an A-TRS; (3) CSI report is based on a periodic Channel State Information-Reference Signal (P-CSI-RS); (4) an uplink grant for CSI report is carried by the MAC layer command; (5) an uplink grant for CSI report is to be transmitted on the active serving cell (such as, the Pcell); and (6) the legacy Sell activation procedure is applied including SMTC delay.

In some example embodiments, the MAC layer command may comprise a MAC CE, and two reserved bits in a header of the MAC CE can be re-defined to indicate the configuration (which indicates behaviors in the Scell activation procedure) to the second device 120. For example, in this case, the indicated configuration may apply to all of the at least one secondary cell to be activated.

Alternatively, in some example embodiments, the MAC layer command may comprise a MAC CE and the MAC CE may be re-designed to separately control behaviors for activating each of the at least one secondary cell. For example, the MAC CE may include a new information element, which uses two or more bits per Scell to indicate one of the above procedures (1)-(6).

Alternatively, in some example embodiments, the MAC layer command may comprise a MAC CE. For example, contents in the MAC CE may be aligned with the legacy Scell activation command, but the logical channel identifier (LCID) of the MAC CE may be used to indicate the configuration (that is, behaviors in the Scell activation procedure). For example, different LCIDs can be used to differentiate the above procedures (1)-(6) and/or their combinations.

Alternatively, in some example embodiments, the MAC layer command may comprise at least a first MAC CE and a second MAC CE. The first MAC CE may be aligned with the legacy Scell activation command (that is, having the legacy LCID), which can be used to instruct activation of the at least one secondary cell. The second MAC CE may have a new LCID, which may be used to indicate the configuration for the at least one secondary cell. In some example embodiments, the second MAC CE may be designed to separately control behaviors for activating each of the at least one secondary cell. For example, the second MAC CE may include a new information element, which uses two or more bits per Scell to indicate one or more combinations of the above procedures (1)~(6).

At block 220, the first device 110 receives an acknowledgement (that is, HARQ-ACK) for the MAC layer command from the second device 120. Then, at block 230, the first device 110 causes the second device 120 to synchronize, based on at least the configuration and the acknowledgement, with the first device 110 on the at least one secondary cell.

In some example embodiments, in the intra-band CA scenario, a secondary cell may be configured with one or more intra-band carriers (also referred to as synchronization reference cell(s)) as its DL synchronization reference, such as, during its configuration stage. If at least one synchronization reference cell is in an active status, the second device 120 can utilize synchronization information (including time and frequency information) from the synchronization reference cell to synchronize with the first device 110 on the secondary cell. That is, after receiving the acknowledgement, the first device 110 may only wait for a predefined time period (such as, 3 ms, which is required by the second device 120 for processing the MAC layer command and preparing RF capabilities), such that the second device 120 can synchronize with the first device 110 on the secondary cell. Alternatively, if the synchronization reference cell is in a de-active status, the first device 110 may cause the second device 120 to conduct a DL synchronization procedure, such as, based on the configuration and the acknowledgement.

Figure 3:
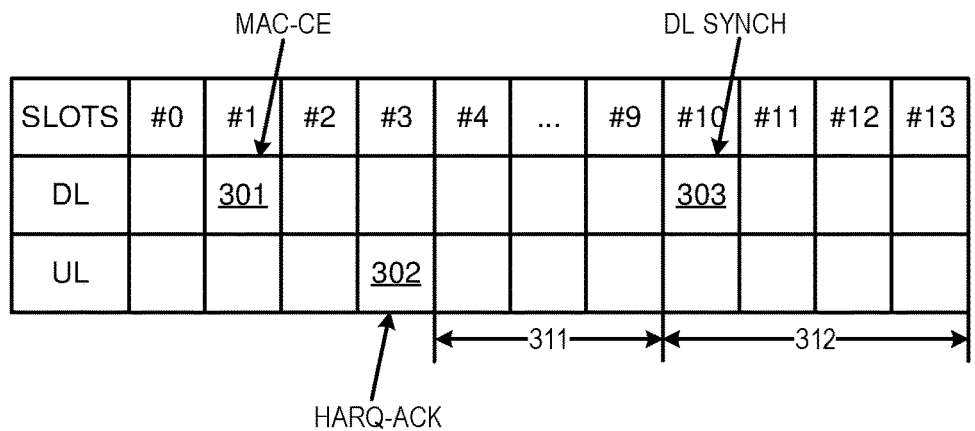
FIG. 3 illustrates an example diagram of acquisition of downlink synchronization on a Scell according to some example embodiments of the present disclosure.

FIG. 3 illustrates an example diagram of the intra-band CA scenario. In FIG. 3, it is assumed that the subcarrier spacing (SCS) is 30 KHz. As shown in FIG. 3, for example, the first device 110 may transmit the MAC layer command to the second device 120 in slot #1, as shown by a reference numeral 301. The first device 110 may receive a HARQ-ACK from the second device 120 in slot #3, as shown by a reference numeral 302. Then, the first device 110 may wait for a predefined time period 311, such as, 3 ms. After that, in slot #10, the second device 120 is capable to receive DCI, as shown by a reference numeral 303. During a time period 312, the Scell is active but CSI for the Scell has not been determined yet. Therefore, the time period 312 is also referred to as a "CSI uncertainty" period. In some example embodiments, the procedure as shown in FIG. 3 can be enabled or disabled by high layer signaling (such as, RRC signaling or MAC layer signaling) in advance. It can be seen from FIG. 3 that, the SMTC periodicity component can be removed from the Scell activation delay. As such, compared with the legacy scheme (where the Scell activation delay is at least: $T_{activation\_time} = T_{SMTC\_Scell} + 5$ ms), the total Scell activation delay can be shortened to 3 ms.

In some example embodiments, the configuration indicated by the MAC layer command may indicate that an A-TRS is to be triggered for DL synchronization (such as, the above procedure (1)). In some example embodiments, prior to transmitting the MAC layer command, the first device 110 may transmit a first indication to the second device 120 via high layer signaling (such as, RRC signaling or MAC layer signaling). For example, the first indication may indicate, to the second device 120, a first time offset between the slot in which the acknowledgement is received at the first device 110 and the slot in which the A-TRS is transmitted from the first device 110. In some example embodiments, the first device 110 may determine, based on the first time offset and the reception of the acknowledgement, a first slot for transmitting the A-TRS. Then, the first device 110 may transmit, in the first slot, the A-TRS to the second device 120 on the at least one secondary cell. The first device 110 may wait for a time period (such as, one slot) after transmitting the A-TRS, such that the second device 120 can synchronize, based on the A-TRS, with the first device 110 on the at least one secondary cell.

Figure 4:
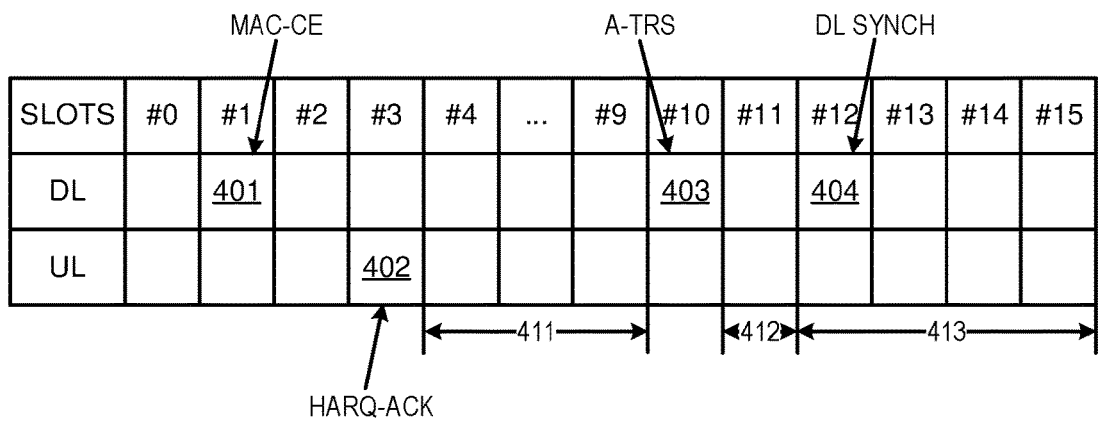
FIG. 4 illustrates an example diagram of acquisition of downlink synchronization on a Scell according to some example embodiments of the present disclosure.

FIG. 4 illustrates an example diagram of such embodiments. In FIG. 4, it is assumed that the SCS is 30 KHz. As shown in FIG. 4, for example, the first device 110 may transmit the MAC layer command to the second device 120 in slot #1, as shown by a reference numeral 401. The first device 110 may receive a HARQ-ACK from the second device 120 in slot #3, as shown by a reference numeral 402. Then, the first device 110 may wait for a first time offset 411 which is configured to the second device 120 in advance via RRC signaling or MAC layer signaling. After that, in slot #10, the first device 110 may transmit an A-TRS to the second device 120, as shown by a reference numeral 403. After that, the first device 110 may wait for a time period 412 (such as, one slot). In slot #12, the second device 120 is capable to receive DCI, as shown by a reference numeral 404. During a CSI uncertainty period 413, the Scell is active but CSI for the Scell may be still uncertain. It can be seen from FIG. 4 that, the SMTC periodicity component can be removed from the Scell activation delay and replaced by 1 ms corresponding to one slot for A-TRS and one slot of synchronization delay. As such, compared with the legacy scheme (where the Scell activation delay is at least: $T_{activation\_time} = T_{SMRC\_Scell} + 5$ ms), the total Scell activation delay can be greatly shortened.

In some example embodiments, the configuration indicated by the MAC layer command may indicate that a SSB burst is to be used for DL synchronization without triggering an A-TRS (such as, the above procedure (2)). In some example embodiments, the first device 110 may determine the SSB burst that occurs earliest after a first time period subsequent to receiving the acknowledgement. For example, the first time period (such as, 3 ms) may be predefined and used by the second device 120 for processing the MAC layer command and RF warm-up. The first device 110 may transmit, during the SSB burst, at least one SSB to the second device 120 on the at least one secondary cell. The first device 110 may wait for a second time period (such as, one slot) after the SSB burst, such that the second device 120 can synchronize, based on the A-TRS, with the first device 110 on the at least one secondary cell.

Figure 5:
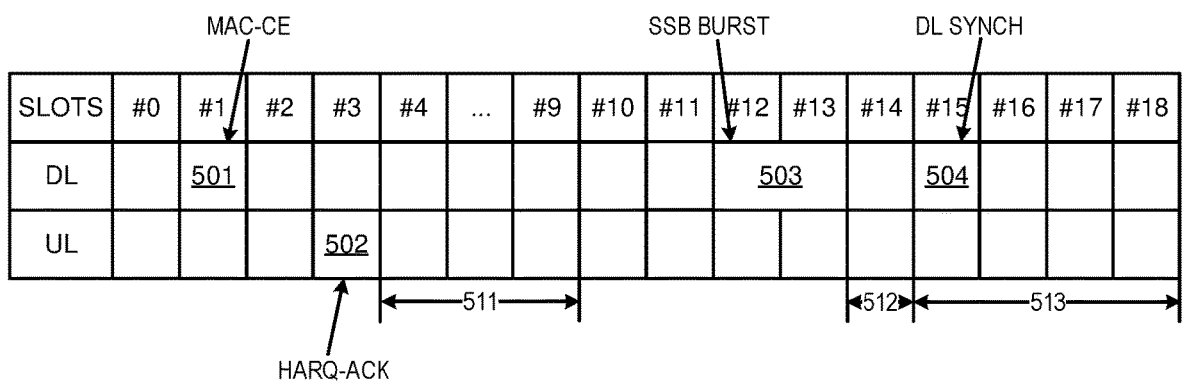
FIG. 5 illustrates an example diagram of acquisition of downlink synchronization on a Scell according to some example embodiments of the present disclosure.

FIG. 5 illustrates an example diagram of such embodiments. In FIG. 5, it is assumed that the subcarrier spacing (SCS) is 30 KHz. As shown in FIG. 5, for example, the first device 110 may transmit the MAC layer command to the second device 120 in slot #1, as shown by a reference numeral 501. The first device 110 may receive a HARQ-ACK from the second device 120 in slot #3, as shown by a reference numeral 502. Then, the first device 110 may wait for a time period 511 (such as, 3 ms) which is predefined and used by the second device 120 for processing the MAC layer command and RF warm-up. After that, a SSB burst that occurs earliest after the first time period 511 can be determined, such as, the SSB burst 503 as shown in FIG. 5. One or more SSBs may be transmitted from the first device 110 to the second device 120 during the SSB burst 503. After the SSB burst 503, the second device 120 may require a time period 512 (such as, one slot) for synchronization with the first device 110. After that, in slot #15, the second device 120 is capable to receive DCI, as shown by a reference numeral 504. During a CSI uncertainty period 513, the Scell is active but CSI for the Scell may be still uncertain. It can be seen from FIG. 5 that, the SMTC periodicity component can be removed from the Scell activation delay replaced by 2.5 ms delay. As such, compared with the legacy scheme (where the Scell activation delay is at least: $T_{activation\_time} = T_{SMTC\_Scell} + 5$ ms), the total Scell activation delay can be greatly shortened.

In some example embodiments, switching between the above procedure (1) (that is, A-TRS is to be triggered for DL synchronization) and the above procedure (2) (that is, DL synchronization relies on a SSB burst) can be achieved, for example, based on an interval between the slot containing the last SSB of the SSB burst (such as, the SSB burst 503 in FIG. 5) and the slot in which the MAC layer command is transmitted or in which the HARQ-ACK for the MAC layer command is received. In response to the interval being below a predetermined threshold, the above procedure (2) can be triggered. Otherwise, the above procedure (1) can be triggered.

With reference back to FIG. 2, at block 240, the first device 110 obtains CSI for the at least one secondary cell from the second device 120.

In some example embodiments, the first device 110 may transmit an aperiodic CSI-RS (A-CSI-RS) to the second device 120 such that the second device 120 determines the CSI by measuring the A-CSI-RS. In some example embodiments, prior to transmitting the MAC layer command, the first device 110 may transmit a second indication to the second device 120 via high layer signaling (such as, RRC signaling or MAC layer signaling). The second indication may indicate, to the second device 120, a second time offset applied to transmission of the A-CSI-RS. In some example embodiments, the second time offset may be relative to reception of the acknowledgement. In this case, the first device 110 may determine, based on the second time offset and the slot for the reception of the acknowledgement, a slot (also referred to "second slot" in the following) for transmitting the A-CSI-RS. Alternatively, in some example embodiments, the second time offset may be relative to a slot (also referred to "third slot" in the following) in which the second device 120 is synchronized with the first device 110 on the at least one secondary cell. In this case, the first device 110 may determine, based on the second time offset and the third slot, the second slot for transmitting the A-CSI-RS.

In some example embodiments, the configuration indicated by the MAC layer command may indicate that an uplink grant for the CSI is carried by the MAC layer command. In this case, after the second device 120 is synchronized with the first device 110, the first device 110 may transmit the A-CSI-RS in the determined second slot, such that the second device 120 can determine the CSI by measuring the A-CSI-RS. The first device 110 may then receive the CSI from the second device 120 in a slot for Physical Uplink Shared Channel (PUSCH) indicated by K2 (which indicates PDCCH or PUSCH timing) in the uplink grant.

Figure 6:
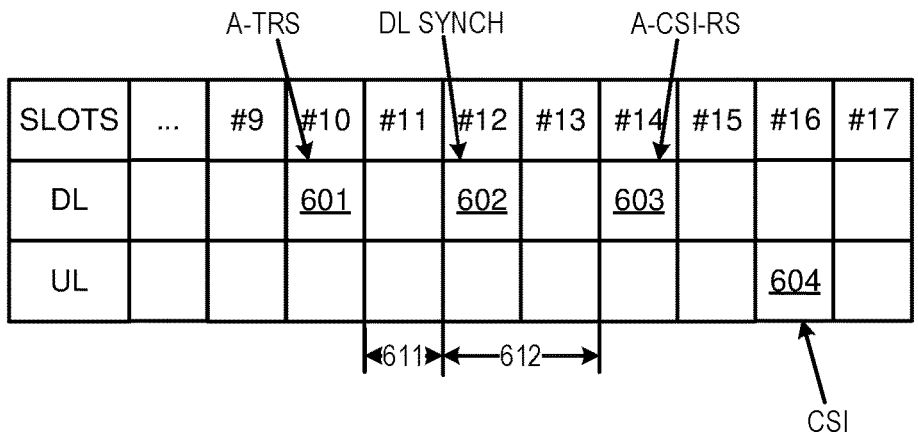
FIG. 6 illustrates an example diagram of Channel State Information (CSI) report for a Scell according to some example embodiments of the present disclosure.

FIG. 6 illustrates an example diagram of such embodiments. In FIG. 6, it is assumed that the subcarrier spacing (SCS) is 30 KHz and the uplink grant for CSI report is carried by the MAC layer command. As shown in FIG. 6, for example, the first device 110 may transmit an A-TRS to the second device 120 in slot #10, as shown by a reference numeral 601. The second device 120 may require a time period 611 (such as, one slot) for synchronization with the first device 110. In slot #12, the second device 120 is synchronized with the first device 110 and ready to receive DCI, as shown by a reference numeral 602. Then, the first device 110 may wait for a second time offset 612 which is configured to the second device 120 in advance via RRC signaling or MAC layer signaling. For example, in FIG. 6, the second time offset 612 is relative to slot #12 (that is, the slot in which the second device 120 is synchronized with the first device 110). In slot #14, the first device 110 may transmit an A-CSI-RS to the second device 120, as shown by a reference numeral 603. The second device 120 can determine the CSI for the Scell by measuring the A-CSI-RS accordingly. Finally, the second device 120 may report the CSI in a UL PUSCH slot (that is, slot #16) indicated by K2 in the uplink grant, as shown by a reference numeral 604.

In some example embodiments, the configuration indicated by the MAC layer command may indicate that an uplink grant for the CSI is to be transmitted on the active serving cell. In this case, after the second device 120 is ready to receive DCI on the active serving cell after transmitting the positive acknowledgement for the MAC layer command, the first device 110 may transmit the uplink grant to the second device 120 on the active serving cell. For example, the uplink grant may indicate, to the second device 120, a UL PUSCH slot for transmitting the CSI. The first device 110 may then transmit the A-CSI-RS in the determined second slot, such that the second device 120 can determine the CSI by measuring the A-CSI-RS. The first device 110 may then receive the CSI from the second device 120 in the UL PUSCH slot indicated by the uplink grant.

Figure 7:
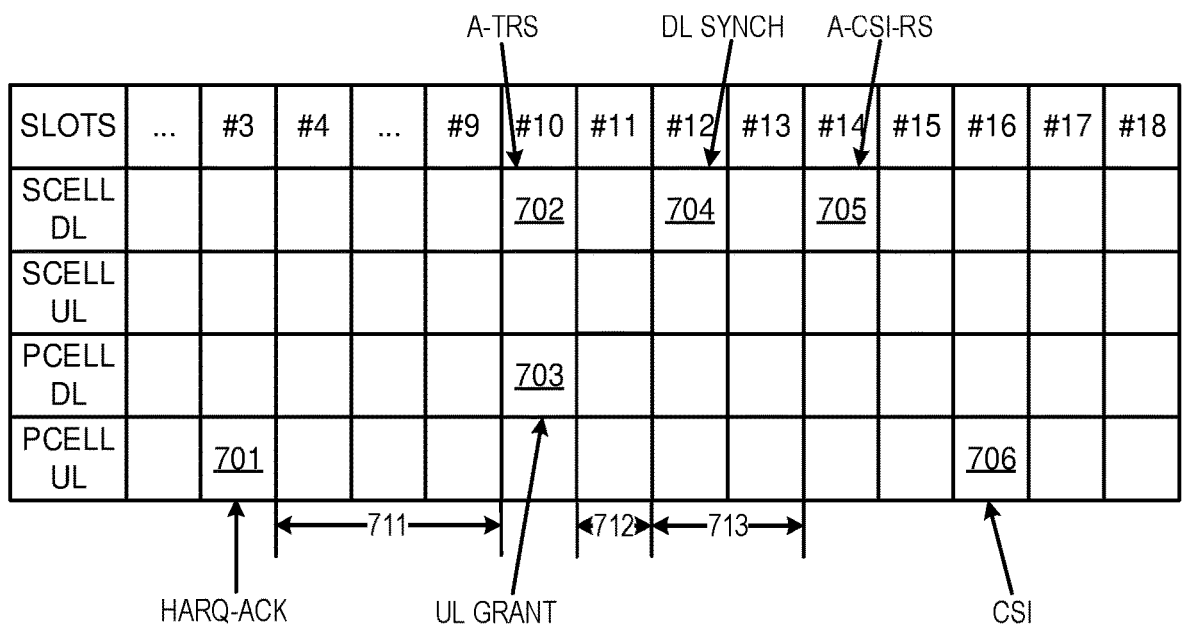
FIG. 7 illustrates an example diagram of CSI report for a Scell according to some example embodiments of the present disclosure.

FIG. 7 illustrates an example diagram of such embodiments. In FIG. 7, it is assumed that the subcarrier spacing (SCS) is 30 KHz and the uplink grant for CSI report is transmitted on the Pcell. As shown in FIG. 7, for example, after transmitting a MAC layer command to the second device 120 on the Pcell, the first device 110 may receive a HARQ-ACK in slot #3, as shown by a reference numeral 701. Then, the first device 110 may wait for a first time offset 711 which is configured to the second device 120 in advance via RRC signaling or MAC layer signaling. After that, in slot #10, the first device 110 may transmit an A-TRS on the Scell to the second device 120, as shown by a reference numeral 702. The first device 110 may also transmit an uplink grant on the Pcell in slot #10, as shown by a reference numeral 703. The second device 120 may require a time period 712 (such as, one slot) for synchronization with the first device 110. In slot #12, the second device 120 is synchronized with the first device 110 and ready to receive DCI, as shown by a reference numeral 704. Then, the first device 110 may wait for a second time offset 713 which is configured to the second device 120 in advance via RRC signaling or MAC layer signaling. For example, in FIG. 7, the second time offset 713 is relative to slot #12 (that is, the slot in which the second device 120 is synchronized with the first device 110). In slot #14, the first device 110 may transmit an A-CSI-RS to the second device 120, as shown by a reference numeral 705. The second device 120 can determine the CSI for the Scell by measuring the A-CSI-RS accordingly. Finally, the second device 120 may report the CSI in a UL PUSCH slot (that is, slot #16) indicated by K2 in the uplink grant, as shown by a reference numeral 706.

It can be seen that, compared with the CSI report procedure as shown in FIG. 6, the CSI report procedure as shown in FIG. 7 may require less efforts on implementation, but require that the terminal device is capable of cross-carrier scheduling. That is, the CSI report procedure as shown in FIG. 6 is applicable to all terminal devices, while the CSI report procedure as shown in FIG. 7 is applicable only to those terminal devices that are capable of cross-carrier scheduling.

It is to be understood that, the above embodiments described with reference to FIGS. 3-7 are also applicable to the second device 120 (such as, the terminal device). For the purpose of simplification, some details will not be repeated in the following.

Figure 8:
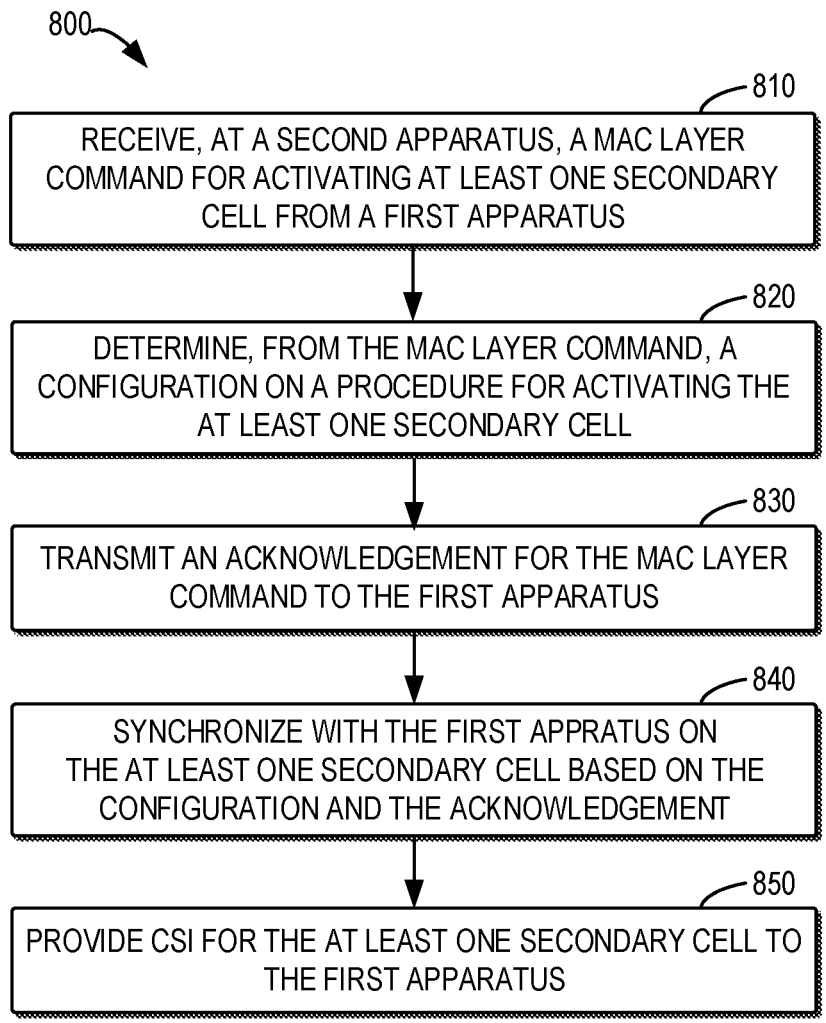
FIG. 8 illustrates a flowchart of an example method according to some example embodiments of the present disclosure.

Reference is now made to FIG. 8, which illustrates a flowchart of an example method 800 in accordance with some example embodiments of the present disclosure. For the purpose of discussion, the method 800 will be described from the perspective of the second device 120 with reference to FIG. 1. It would be appreciated that the method 800 may include additional blocks or omit some illustrated block. The scope of the present disclosure is not limited in this aspect.

At block 810, the second device 120 receives a MAC layer command for activating at least one secondary cell from the first device 110.

At block 820, the second device 120 determines, from the MAC layer command, a configuration on a procedure for activating the at least one secondary cell.

In some example embodiments, the MAC layer command may comprise a MAC control element and the second device 120 may determine the configuration from a header of the MAC control element.

In some example embodiments, the MAC layer command may comprise a MAC control element and the second device 120 may determine the configuration from an information element in the MAC control element.

In some example embodiments, the MAC layer command may comprise a MAC control element and the second device 120 may determine the configuration from a logical channel identifier of the MAC control element.

In some example embodiments, the MAC layer command may comprise at least a first MAC control element having a first logical channel identifier and a second MAC control element having a second logical channel identifier different from the first logical channel identifier. In response to determining that the first MAC control element activates the at least one secondary cell, the second device 120 may determine the configuration from the second MAC control element.

At block 830, the second device 120 transmits an acknowledgement (that is, HARQ-ACK) for the MAC layer command to the first device 110.

At block 840, the second device 120 synchronizes, based on at least the configuration and the acknowledgement, with the first device 110 on the at least one secondary cell.

In some example embodiments, the configuration may indicate that an aperiodic tracking reference signal is to be used for synchronizing with the first device 110 on the at least one secondary cell. In some example embodiments, prior to receiving the MAC layer command, the second device 120 may receive a first indication from the first device 110. The first indication may indicate, to the second device 120, a first time offset between transmission of the acknowledgement and reception of the aperiodic tracking reference signal. In some example embodiments, in response to the first time offset being indicated to the second device 120, the second device 120 may determine, based on the first time offset and the transmission of the acknowledgement, a first slot for receiving the aperiodic tracking reference signal. The second device 120 may receive, in the first slot, the aperiodic tracking reference signal from the first device 110 on the at least one secondary cell. The second device 120 may synchronize, based on the aperiodic tracking reference signal, with the first device 110 on the at least one secondary cell.

In some example embodiments, the configuration determined from the MAC layer command may indicate that a Synchronization Signal Block burst is to be used for synchronizing with the first device 110 on the at least one secondary cell. In some example embodiments, the second device 120 may determine the Synchronization Signal Block burst that occurs earliest after a first time period subsequent to transmitting the acknowledgement. The first time period may be used by the second device 120 for processing the MAC layer command and RF warm-up. The second device 120 may receive, during the Synchronization Signal Block burst, at least one Synchronization Signal Block from the first device 110 on the at least one secondary cell. The second device 120 may synchronize, based on the at least one Synchronization Signal Block, with the first device 110 on the at least one secondary cell.

At block 850, the second device 120 provides CSI for the at least one secondary cell to the first device 110.

In some example embodiments, prior to receiving the MAC layer command, the second device 120 may receive a second indication from the first device 110. The second indication may indicate, to the second device 120, a second time offset applied to reception of an aperiodic Channel State Information-Reference Signal.

In some example embodiments, the configuration determined from the MAC layer command may indicate that an uplink grant for the channel state information is carried by the MAC layer command. In response to the second time offset being indicated to the second device 120, the second device 120 may determine, based on at least the second time offset, a second slot for receiving the aperiodic Channel State Information-Reference Signal; receive, in the second slot, the aperiodic Channel State Information-Reference Signal from the first device 110 on the at least one secondary cell; and determine, based on the aperiodic Channel State Information-Reference Signal, the channel state information. The second device 120 may transmit, based on the uplink grant, the channel state information to the first device 110 on the at least one secondary cell.

In some example embodiments, the configuration indicates that an uplink grant for the channel state information is to be transmitted to the second device 120 on the active serving cell. In response to being ready to receive the uplink grant on the active serving cell after transmitting the positive acknowledgement to the first device 110, the second device 120 may receive the uplink grant from the first device 110 on the active serving cell. In response to the second time offset being indicated to the second device 120, the second device 120 may determine, based on at least the second time offset, a second slot for receiving the aperiodic Channel State Information-Reference Signal; receive, in the second slot, the aperiodic Channel State Information-Reference Signal from the first device 110 on the at least one secondary cell; and determine, based on the aperiodic Channel State Information-Reference Signal, the channel state information. The second device 120 may transmit, based on the uplink grant, the channel state information to the first device 110 on the at least one secondary cell.

In some example embodiments, the second time offset may be relative to transmission of the acknowledgement. In some example embodiments, the second device 120 may determine, based on the second time offset and the transmission of the acknowledgement, the second slot for receiving the aperiodic Channel State Information-Reference Signal.

In some example embodiments, the second time offset may be relative to a third slot in which the second device 120 is synchronized with the first device 110 on the at least one secondary cell. In some example embodiments, the second device 120 may determine, based on the second time offset and the third slot, the second slot for receiving the aperiodic Channel State Information-Reference Signal.

In some example embodiments, the first device 110 may be a network device and the second device 120 may be a terminal device.

In view of the above, it can be seen that, example embodiments of the present disclosure provide a solution for Scell activation. In this solution, the network device may transmit to the terminal device an explicit indication in the MAC layer command to guide behaviors of the terminal device in the following aspects: (i) DL synchronization tracking; (ii) Channel State Information-Reference Signal measurement; and (iii) CSI report. Further, in the intra-band CA scenario, if a Scell to be activated is configured with a synchronization reference cell which is in an active status, the terminal device can directly utilize synchronization information from the synchronization reference cell as its DL synchronization reference. As such, the SMTC periodicity component can be removed from the Scell activation delay and the Scell activation delay can be greatly reduced. Further, the solution for Scell activation according to example embodiments of the present disclosure can support terminal devices that are capable or not capable of A-TRS based synchronization. The solution for Scell activation according to example embodiments of the present disclosure can also support terminal devices that are capable or not capable of cross-carrier PDCCH monitoring.

In some example embodiments, a first apparatus capable of performing the method 200 may comprise means for performing the respective steps of the method 200. The means may be implemented in any suitable form. For example, the means may be implemented in a circuitry or software module.

In some example embodiments, the first apparatus comprises means for transmitting, on a serving cell in an active status, a MAC layer command for activating at least one secondary cell to a second apparatus, the MAC layer command indicating a configuration on a procedure for activating the at least one secondary cell; means for receiving an acknowledgement for the MAC layer command from the second apparatus; and means for causing the second apparatus to synchronize, based on at least the configuration and the acknowledgement, with the first apparatus on the at least one secondary cell.

In some example embodiments, the configuration indicates that an aperiodic tracking reference signal is to be used by the second apparatus for synchronizing with the first apparatus on the at least one secondary cell. In some example embodiments, the means for causing the second apparatus to synchronize with the first apparatus on the at least one secondary cell comprises means for, in response to a first time offset between reception of the acknowledgement and transmission of the aperiodic tracking reference signal being indicated to the second apparatus, determining, based on the first time offset and the reception of the acknowledgement, a first slot for transmitting the aperiodic tracking reference signal; means for transmitting, in the first slot, the aperiodic tracking reference signal to the second apparatus on the at least one secondary cell; and means for waiting for a time period after transmitting the aperiodic tracking reference signal, such that the second apparatus is synchronized, based on the aperiodic tracking reference signal, with the first apparatus on the at least one secondary cell.

In some example embodiments, the first apparatus further comprises means for prior to transmitting the MAC layer command, transmitting a first indication of the first time offset to the second apparatus.

In some example embodiments, the configuration indicates that a Synchronization Signal Block burst is to be used by the second apparatus for synchronizing with the first apparatus on the at least one secondary cell. In some example embodiments, the means for causing the second apparatus to synchronize with the first apparatus on the at least one secondary cell comprises means for determining the Synchronization Signal Block burst that occurs earliest after a first time period subsequent to receiving the acknowledgement, the first time period being used by the second apparatus for processing the MAC layer command and RF warm-up; means for transmitting, during the Synchronization Signal Block burst, at least one Synchronization Signal Block to the second apparatus on the at least one secondary cell; and means for waiting for a second time period after transmitting the at least one Synchronization Signal Block, such that the second apparatus is synchronized, based on the at least one Synchronization Signal Block, with the first apparatus on the at least one secondary cell.

In some example embodiments, the first apparatus further comprises means for obtaining channel state information for the at least one secondary cell from the second apparatus.

In some example embodiments, the configuration indicates that an uplink grant for the channel state information is carried by the MAC layer command. In some example embodiments, the means for obtaining channel state information comprises means for, in response to a second time offset applied to transmission of an aperiodic Channel State Information-Reference Signal being indicated to the second apparatus, determining, based on at least the second time offset, a second slot for transmitting the aperiodic Channel State Information-Reference Signal; and means for transmitting, in the second slot, the aperiodic Channel State Information-Reference Signal to the second apparatus on the at least one secondary cell; and means for receiving, based on the uplink grant, the channel state information from the second apparatus on the at least one secondary cell.

In some example embodiments, the configuration indicates that an uplink grant for the channel state information is to be transmitted to the second apparatus on the active serving cell. In some example embodiments, the means for obtaining channel state information comprises means for transmitting the uplink grant to the second apparatus on the active serving cell; means for, in response to a second time offset applied to transmission of an aperiodic Channel State Information-Reference Signal being indicated to the second apparatus, determining, based on at least the second time offset, a second slot for transmitting the aperiodic Channel State Information-Reference Signal; and means for transmitting, in the second slot, the aperiodic Channel State Information-Reference Signal to the second apparatus on the at least one secondary cell; and means for receiving, based on the uplink grant, the channel state information from the second apparatus on the at least one secondary cell.

In some example embodiments, the second time offset is relative to reception of the acknowledgement. In some example embodiments, the means for determining a second slot for transmitting the aperiodic Channel State Information-Reference Signal comprises means for determining, based on the second time offset and the reception of the acknowledgement, the second slot for transmitting the aperiodic Channel State Information-Reference Signal.

In some example embodiments, the second time offset is relative to a third slot in which the second apparatus is synchronized with the first apparatus on the at least one secondary cell. In some example embodiments, the means for determining a second slot for transmitting the aperiodic Channel State Information-Reference Signal comprises means for determining, based on the second time offset and the third slot, the second slot for transmitting the aperiodic Channel State Information-Reference Signal.

In some example embodiments, the first apparatus further comprises means for prior to transmitting the MAC layer command, transmitting a second indication of the second time offset to the second apparatus.

In some example embodiments, the MAC layer command comprises a MAC control element and the configuration is indicated by a header of the MAC control element.

In some example embodiments, the MAC layer command comprises a MAC control element and the configuration is indicated by an information element in the MAC control element.

In some example embodiments, the MAC layer command comprises a MAC control element and the configuration is indicated by a logical channel identifier of the MAC control element.

In some example embodiments, the MAC layer command comprises at least a first MAC control element having a first logical channel identifier and a second MAC control element having a second logical channel identifier different from the first logical channel identifier. In some example embodiments, the first MAC control element activates the at least one secondary cell and the second MAC control element comprises an indication of the configuration.

In some example embodiments, the first apparatus comprises a network device and the second apparatus comprises a terminal device.

In some example embodiments, a second apparatus capable of performing the method 800 may comprise means for performing the respective steps of the method 800. The means may be implemented in any suitable form. For example, the means may be implemented in a circuitry or software module.

In some example embodiments, the second apparatus comprises means for receiving, on a serving cell in an active status, a MAC layer command for activating at least one secondary cell from a first apparatus; means for determining, from the MAC layer command, a configuration on a procedure for activating the at least one secondary cell; means for transmitting an acknowledgement for the MAC layer command to the first apparatus; and means for synchronizing, based on at least the configuration and the acknowledgement, with the first apparatus on the at least one secondary cell.

In some example embodiments, the configuration indicates that an aperiodic tracking reference signal is to be used for synchronizing with the first apparatus on the at least one secondary cell. In some example embodiments, the means for synchronizing with the first apparatus on the at least one secondary cell comprises means for, in response to a first time offset between transmission of the acknowledgement and reception of the aperiodic tracking reference signal being indicated to the second apparatus, determining, based on the first time offset and the transmission of the acknowledgement, a first slot for receiving the aperiodic tracking reference signal; means for receiving, in the first slot, the aperiodic tracking reference signal from the first apparatus on the at least one secondary cell; and means for synchronizing, based on the aperiodic tracking reference signal, with the first apparatus on the at least one secondary cell.

In some example embodiments, the second apparatus further comprises means for prior to receiving the MAC layer command, receiving a first indication of the first time offset from the first apparatus.

In some example embodiments, the configuration indicates that a Synchronization Signal Block burst is to be used for synchronizing with the first apparatus on the at least one secondary cell. In some example embodiments, the means for synchronizing with the first apparatus on the at least one secondary cell comprises means for determining the Synchronization Signal Block burst that occurs earliest after a first time period subsequent to transmitting the acknowledgement, the first time period being used by the second apparatus for processing the MAC layer command and RF warm-up; means for receiving, during the Synchronization Signal Block burst, at least one Synchronization Signal Block from the first apparatus on the at least one secondary cell; and means for synchronizing, based on the at least one Synchronization Signal Block, with the first apparatus on the at least one secondary cell.

In some example embodiments, the second apparatus further comprises means for providing channel state information for the at least one secondary cell to the first apparatus.

In some example embodiments, the configuration indicates that an uplink grant for the channel state information is carried by the MAC layer command. In some example embodiments, the means for providing channel state information for the at least one secondary cell comprises means for, in response to a second time offset applied to reception of an aperiodic Channel State Information-Reference Signal being indicated to the second apparatus, determining, based on at least the second time offset, a second slot for receiving the aperiodic Channel State Information-Reference Signal; means for receiving, in the second slot, the aperiodic Channel State Information-Reference Signal from the first apparatus on the at least one secondary cell; and means for determining, based on the aperiodic Channel State Information-Reference Signal, the channel state information; and means for transmitting, based on the uplink grant, the channel state information to the first apparatus on the at least one secondary cell.

In some example embodiments, the configuration indicates that an uplink grant for the channel state information is to be transmitted to the second apparatus on the active serving cell. In some example embodiments, the means for providing channel state information for the at least one secondary cell comprises means for receiving the uplink grant from the first apparatus on the active serving cell; means for, in response to a second time offset applied to reception of an aperiodic Channel State Information-Reference Signal being indicated to the second apparatus, determining, based on at least the second time offset, a second slot for receiving the aperiodic Channel State Information-Reference Signal; means for receiving, in the second slot, the aperiodic Channel State Information-Reference Signal from the first apparatus on the at least one secondary cell; and means for determining, based on the aperiodic Channel State Information-Reference Signal, the channel state information; and means for transmitting, based on the uplink grant, the channel state information to the first apparatus on the at least one secondary cell.

In some example embodiments, the second time offset is relative to transmission of the acknowledgement. In some example embodiments, the means for determining a second slot for receiving the aperiodic Channel State Information-Reference Signal comprises means for determining, based on the second time offset and the transmission of the acknowledgement, the second slot for receiving the aperiodic Channel State Information-Reference Signal.

In some example embodiments, the second time offset is relative to a third slot in which the second apparatus is synchronized with the first apparatus on the at least one secondary cell. In some example embodiments, the means for determining a second slot for receiving the aperiodic Channel State Information-Reference Signal comprises means for determining, based on the second time offset and the third slot, the second slot for receiving the aperiodic Channel State Information-Reference Signal.

In some example embodiments, the second apparatus further comprises means for prior to receiving the MAC layer command, receiving a second configuration of the second time offset from the first apparatus.

In some example embodiments, the MAC layer command comprises a MAC control element and the means for determining a configuration on a procedure for activating the at least one secondary cell comprises means for determining the configuration from a header of the MAC control element.

In some example embodiments, the MAC layer command comprises a MAC control element and the means for determining a configuration on a procedure for activating the at least one secondary cell comprises means for determining the configuration from an information element in the MAC control element.

In some example embodiments, the MAC layer command comprises a MAC control element and the means for determining a configuration on a procedure for activating the at least one secondary cell comprises means for determining the configuration from a logical channel identifier of the MAC control element.

In some example embodiments, the MAC layer command comprises at least a first MAC control element having a first logical channel identifier and a second MAC control element having a second logical channel identifier different from the first logical channel identifier. In some example embodiments, the means for determining a configuration on a procedure for activating the at least one secondary cell comprises means for, in response to determining that the first MAC control element activates the at least one secondary cell, determining the configuration from the second MAC control element.

In some example embodiments, the first apparatus comprises a network device and the second apparatus comprises a terminal device.

Figure 9:
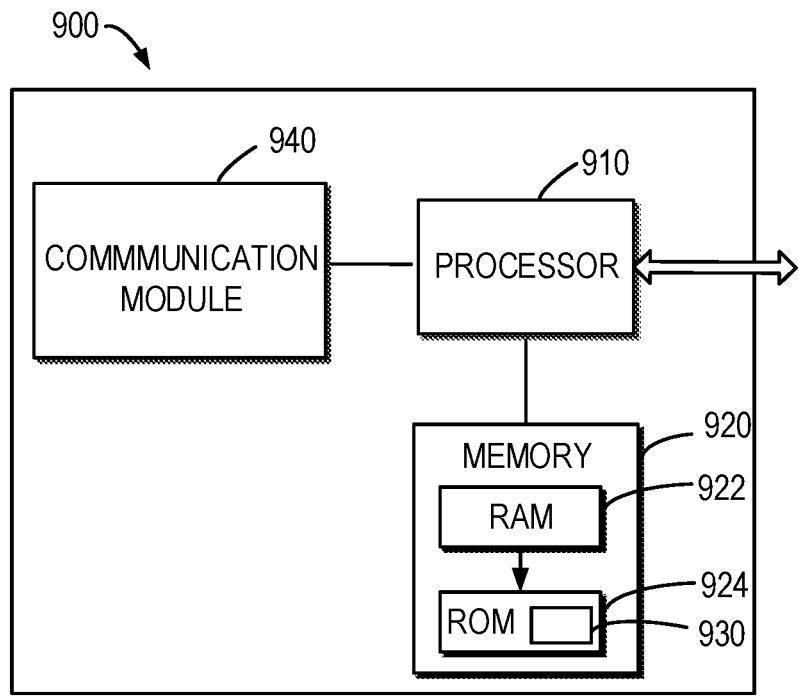
FIG. 9 illustrates a simplified block diagram of an apparatus that is suitable for implementing embodiments of the present disclosure.

FIG. 9 is a simplified block diagram of a device 900 that is suitable for implementing embodiments of the present disclosure. The device 900 may be provided to implement the communication device, for example the first device 110 or the second device 120 as shown in FIG. 1. As shown, the device 900 includes one or more processors 910, one or more memories 920 coupled to the processor 910, and one or more communication modules 940 coupled to the processor 910.

The communication module 940 is for bidirectional communications. The communication module 940 has at least one antenna to facilitate communication. The communication interface may represent any interface that is necessary for communication with other network elements.

The processor 910 may be of any type suitable to the local technical network and may include one or more of the following: general purpose computers, special purpose computers, microprocessors, digital signal processors (DSPs) and processors based on multicore processor architecture, as non-limiting examples. The device 900 may have multiple processors, such as an application specific integrated circuit chip that is slaved in time to a clock which synchronizes the main processor.

The memory 920 may include one or more non-volatile memories and one or more volatile memories. Examples of the non-volatile memories include, but are not limited to, a Read Only Memory (ROM) 924, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 922 and other volatile memories that will not last in the power-down duration.

A computer program 930 includes computer executable instructions that are executed by the associated processor 910. The program 930 may be stored in the ROM 924. The processor 910 may perform any suitable actions and processing by loading the program 930 into the RAM 922.

The embodiments of the present disclosure may be implemented by means of the program 930 so that the device 900 may perform any process of the disclosure as discussed with reference to FIGS. 2 and/or 8. The embodiments of the present disclosure may also be implemented by hardware or by a combination of software and hardware.

Figure 10:
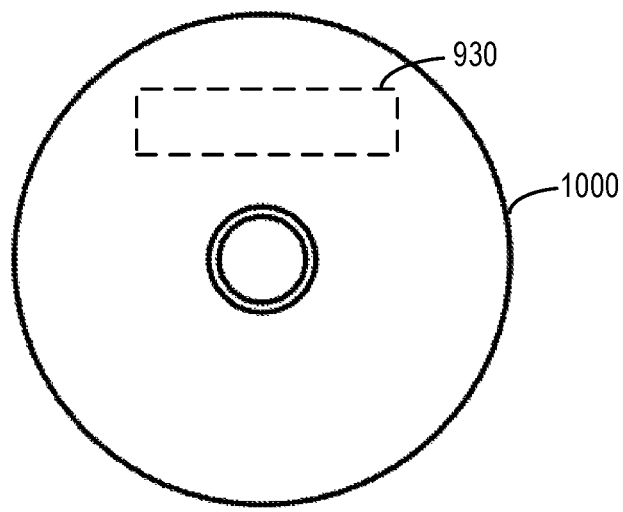
FIG. 10 illustrates a block diagram of an example computer readable medium in accordance with some example embodiments of the present disclosure.

In some example embodiments, the program 930 may be tangibly contained in a computer readable medium which may be included in the device 900 (such as in the memory 920) or other storage devices that are accessible by the device 900. The device 900 may load the program 930 from the computer readable medium to the RAM 922 for execution. The computer readable medium may include any types of tangible non-volatile storage, such as ROM, EPROM, a flash memory, a hard disk, CD, DVD, and the like. FIG. 10 shows an example of the computer readable medium 1000 in form of CD or DVD. The computer readable medium has the program 930 stored thereon.

It should be appreciated that future networks may utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications, this may mean node operations to be carried out, at least partly, in a central/centralized unit, CU, (e.g. server, host or node) operationally coupled to distributed unit, DU, (e.g. a radio head/node). It is also possible that node operations will be distributed among a plurality of servers, nodes or hosts. It should also be understood that the distribution of labour between core network operations and base station operations may vary depending on implementation.

In an embodiment, the server may generate a virtual network through which the server communicates with the distributed unit. In general, virtual networking may involve a process of combining hardware and software network resources and network functionality into a single, software-based administrative entity, a virtual network. Such virtual network may provide flexible distribution of operations between the server and the radio head/node. In practice, any digital signal processing task may be performed in either the CU or the DU and the boundary where the responsibility is shifted between the CU and the DU may be selected according to implementation.

Therefore, in an embodiment, a CU-DU architecture is implemented. In such case the apparatus 900 may be comprised in a central unit (e.g. a control unit, an edge cloud server, a server) operatively coupled (e.g. via a wireless or wired network) to a distributed unit (e.g. a remote radio head/node). That is, the central unit (e.g. an edge cloud server) and the distributed unit may be stand-alone apparatuses communicating with each other via a radio path or via a wired connection. Alternatively, they may be in a same entity communicating via a wired connection, etc. The edge cloud or edge cloud server may serve a plurality of distributed units or a radio access networks. In an embodiment, at least some of the described processes may be performed by the central unit. In another embodiment, the apparatus 900 may be instead comprised in the distributed unit, and at least some of the described processes may be performed by the distributed unit.

In an embodiment, the execution of at least some of the functionalities of the apparatus 900 may be shared between two physically separate devices (DU and CU) forming one operational entity. Therefore, the apparatus may be seen to depict the operational entity comprising one or more physically separate devices for executing at least some of the described processes. In an embodiment, such CU-DU architecture may provide flexible distribution of operations between the CU and the DU. In practice, any digital signal processing task may be performed in either the CU or the DU and the boundary where the responsibility is shifted between the CU and the DU may be selected according to implementation. In an embodiment, the apparatus 900 controls the execution of the processes, regardless of the location of the apparatus and regardless of where the processes/functions are carried out.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 400 as described above with reference to FIG. 4. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first apparatus comprising:
   at least one processor; and
   at least one memory including computer program codes;
   the at least one memory and the computer program codes are configured to, with the at least one processor, cause the first apparatus to:
   transmit, on a serving cell in an active status, a Media Access Control (MAC) layer command for activating at least one secondary cell to a second apparatus, the MAC layer command indicating a configuration on a procedure for activating the at least one secondary cell;
   receive an acknowledgement for the MAC layer command from the second apparatus;
   cause the second apparatus to synchronize, based on at least the configuration and the acknowledgement, with the first apparatus on the at least one secondary cell; and
   wherein the configuration indicates that an aperiodic tracking reference signal is to be used by the second apparatus for synchronizing with the first apparatus on the at least one secondary cell, and wherein the at least one memory and the computer program codes are configured to, with the at least one processor, cause the first apparatus to:
in response to a first time offset between reception of the acknowledgement and transmission of the aperiodic tracking reference signal being indicated to the second apparatus,
determine, based on the first time offset and the reception of the acknowledgement, a first slot for transmitting the aperiodic tracking reference signal;
transmit, in the first slot, the aperiodic tracking reference signal to the second apparatus on the at least one secondary cell; and
wait for a time period after transmitting the aperiodic tracking reference signal, such that the second apparatus is synchronized, based on the aperiodic tracking reference signal, with the first apparatus on the at least one secondary cell.

2. The first apparatus of claim 1, wherein the at least one memory and the computer program codes are further configured to, with the at least one processor, cause the first apparatus to:
prior to transmitting the MAC layer command, transmit a first indication of the first time offset to the second apparatus.

3. The first apparatus of claim 1, wherein the at least one memory and the computer program codes are further configured to, with the at least one processor, cause the first apparatus to:
obtain channel state information for the at least one secondary cell from the second apparatus.

* * * * *